(12) United States Patent
Howell et al.

(10) Patent No.: US 7,003,319 B1
(45) Date of Patent: Feb. 21, 2006

(54) DATA CARRIER SYSTEM

(75) Inventors: Stephen Andrew Howell, Barnwood (GB); Nigel Everard Barnes, Alresford (GB)

(73) Assignee: Motorola, Inc., Schaumberg, IL (US)

( * ) Notice: Subject to any disclaimer, the term of this patent is extended or adjusted under 35 U.S.C. 154(b) by 0 days.

(21) Appl. No.: 09/673,273

(22) PCT Filed: Apr. 15, 1999

(86) PCT No.: PCT/EP99/02578

§ 371 (c)(1),
(2), (4) Date: Jan. 16, 2001

(87) PCT Pub. No.: WO99/55105

PCT Pub. Date: Oct. 28, 1999

(30) Foreign Application Priority Data

Apr. 16, 1998 (GB) .................................. 9807967

(51) Int. Cl.
*H04M 1/00* (2006.01)
(52) U.S. Cl. .................. 455/558; 455/346; 455/349; 379/88.28; 710/302
(58) Field of Classification Search ............ 455/414.1, 455/414.3, 558, 556.1, 556.2, 557, 575.1, 455/575.9, 90.1, 343.6, 344–349, 351, 412; 379/88.28; 710/300–304, 313
See application file for complete search history.

(56) References Cited

U.S. PATENT DOCUMENTS

| | | | | |
|---|---|---|---|---|
| 5,353,328 A * | 10/1994 | Jokimies | .................... | 455/558 |
| 5,487,099 A * | 1/1996 | Maekawa | ................ | 455/556.1 |
| 5,490,202 A * | 2/1996 | Maekawa | ................... | 455/558 |
| 5,586,166 A * | 12/1996 | Turban | ....................... | 455/558 |
| 5,659,890 A * | 8/1997 | Hidaka | ..................... | 340/7.54 |
| 5,771,468 A * | 6/1998 | Stein | ......................... | 455/561 |
| 5,875,404 A * | 2/1999 | Messiet | .................... | 455/558 |
| 5,884,168 A * | 3/1999 | Kolev et al. | ............. | 455/432.1 |
| 5,915,226 A * | 6/1999 | Martineau | .................. | 455/558 |

* cited by examiner

*Primary Examiner*—Charles Craver
(74) *Attorney, Agent, or Firm*—John J. King; Brian M. Mancini; Thomas V. Miller

(57) ABSTRACT

A cellular telephone (102) in a vehicle includes a data carrier system comprising a first semi-permanent Subscriber Identity Module (SIM) (200) selectively couplable to the cellular telephone (102) and a second SIM (300) selectively couplable to the cellular telephone (102) in preference to the first SIM (200), the first SIM (200) being arranged to be decoupled from the cellular telephone (102) when the second SIM (300) is coupled to the cellular telephone (102). During a predetermined period of time, the cellular telephone (102) is arranged to be ensured of a supply of power and the second SIM (300) is arranged to be decoupled from the cellular telephone (102), thereby causing the first SIM (200) to be coupled to the cellular telephone (102) for the execution of a task requiring the first SIM (200).

22 Claims, 4 Drawing Sheets

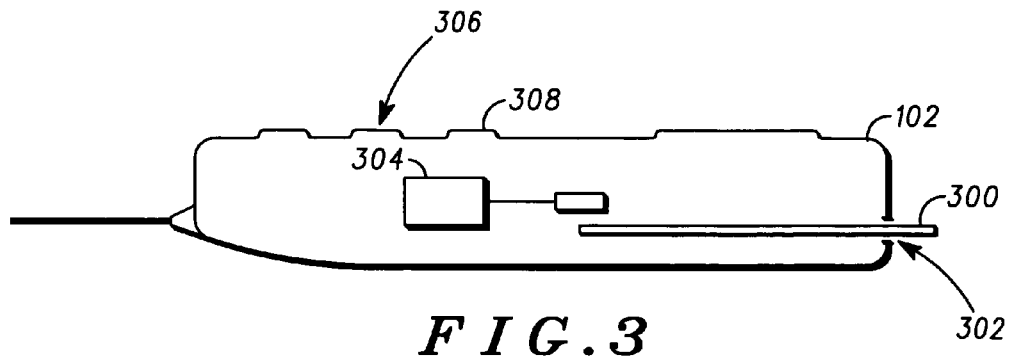
FIG.3
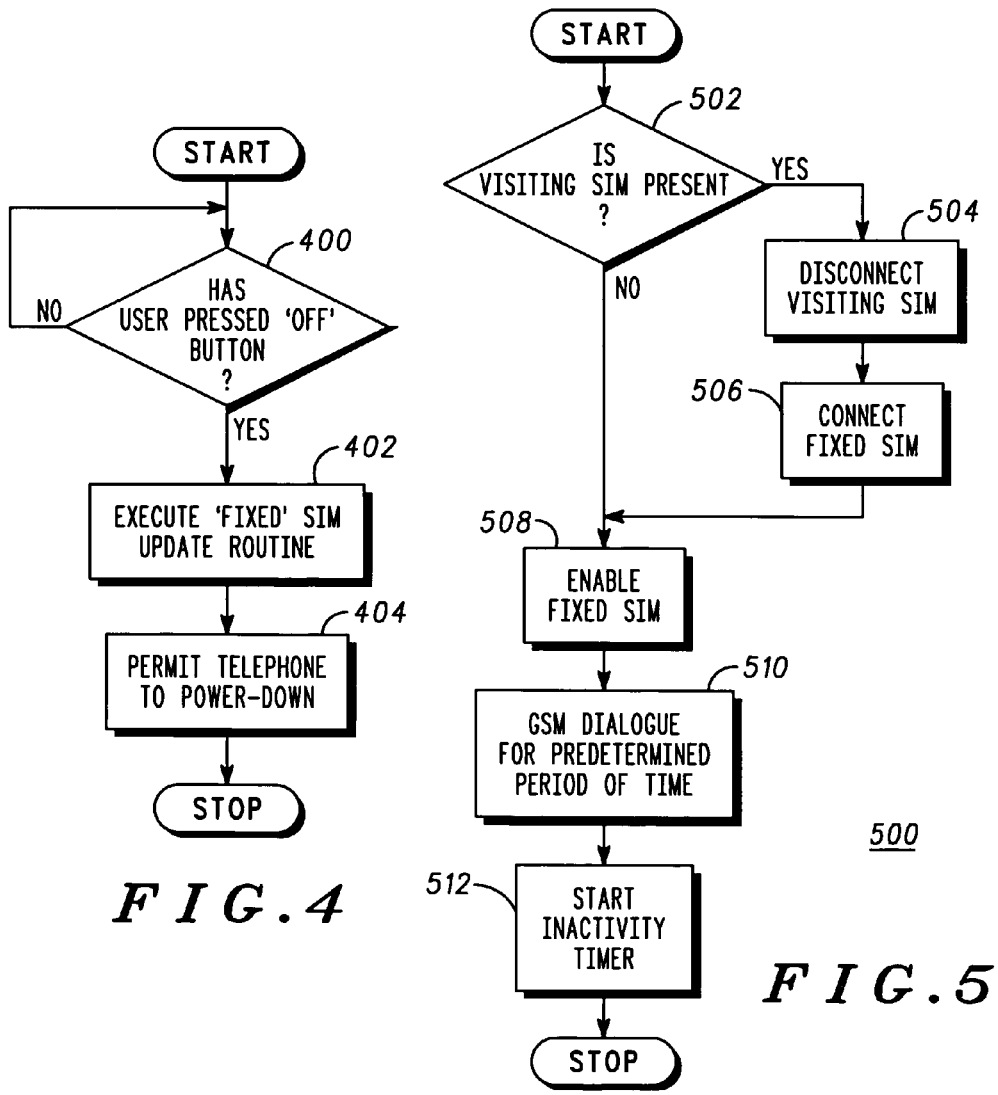
FIG.4
FIG.5

DATA CARRIER SYSTEM

FIELD OF THE INVENTION

The present invention relates to a data carrier system, for example, of the type used by communications devices, such as cellular telephones. The present invention also relates to a method of operating the data carrier system.

BACKGROUND OF THE INVENTION

It is known in some cellular telephony applications to install and activate a data carrier, such as a Subscriber Identity Module (SIM), in a cellular telephone so as to enable the cellular telephone to operate fully, otherwise a limited service is available. For example, in the Global System for Mobile communication (GSM) system, a SIM must be installed and activated in a GSM telephone in order to be able to use the GSM telephone, otherwise emergency calls may only be placed.

Less common, but still known in the art, is a cellular telephone having the capability of receiving two SIMs (a dual-SIM configuration): a semi-permanently installed SIM or fixed SIM having a first subscription associated therewith, and a visiting SIM having a second subscription associated therewith which may vary depending upon a user of the cellular telephone. The visiting SIM can be installed intermittently when required by the user. In such a configuration, even if both SIMs are electrically coupled to the cellular telephone, only one of the two SIMs is activated, since only one of the first and second subscriptions can be accepted by the network for any single cellular telephone. Therefore, the fixed SIM is usually disregarded or electrically decoupled from the cellular telephone when the visiting SIM is installed, the visiting SIM being activated in preference to the fixed SIM. The fixed SIM is thus not visible to the network.

When the visiting SIM is removed, the fixed SIM is activated and the first subscription becomes the active subscription in the network. If another, or the same visiting SIM is re-installed, the fixed SIM is deactivated and the first subscription not used; the new or the same visiting SIM and associated second or other subscription becomes active. Generally, since the visiting SIM has priority over the fixed SIM, if the visiting SIM is never removed, the fixed SIM is never activated.

Applications are emerging for cellular telephones integrated into vehicles in order to add functionality to security or safety features of the vehicle. However, in order for such security or safety features to be efficient and effective, data stored on the fixed SIM must be accurate and up-to-date.

In the above described dual-SIM configuration, this is not realistically achieved, since it is not possible to guarantee that the fixed SIM can be kept up-to-date because of the possibility that the fixed SIM may never communicate with the network for a prolonged period of time. It is therefore an object of the present invention to provide a data carrier system which obviates or mitigates the above described problem.

SUMMARY OF THE INVENTION

According to the present invention, there is provided a data carrier system comprising a first data carrier selectively couplable to a communications device and a second data carrier selectively couplable to the communications device in preference to the first data carrier, the first data carrier being arranged to be decoupled from the communications device when the second data carrier is coupled to the communications device; and during a predetermined period of time the communications device is arranged to be ensured of a supply of power and the second data carrier is arranged to be decoupled from the communications device, thereby causing the first data carrier to be coupled to the communications device for the execution of a task requiring the first data carrier.

According to the present invention, there is also provided a method of operating a data carrier system including a first data carrier selectively couplable to a communications device and a second data carrier selectively couplable to the communications device in preference to the first data carrier, the first data carrier being arranged to be decoupled from the communications device when the second data carrier is coupled to the communications device, the method comprising the steps of: during a predetermined period of time, ensuring a supply of power to the communications device, and decoupling the second data carrier from the communications device, thereby causing the first data carrier to be coupled to the communications device for the execution of a task requiring the first data carrier.

It is thus possible to provide a system and method for updating the first data carrier.

Other, preferred, features and advantages will become apparent from the accompanying description, drawings and dependent claims.

BRIEF DESCRIPTION OF THE DRAWINGS

At least one embodiment of the invention will not be described, by way or example, with reference to the accompanying drawings, in which:

FIGS. 2 and 3 are schematic diagrams of apparatus constituting an embodiment of the invention;

FIGS. 4 to 6 are flow diagrams of a method of operation of the apparatus of FIGS. 2 and 3 in one embodiment of the invention.

DESCRIPTION OF A PREFERRED EMBODIMENT

Figure 1:
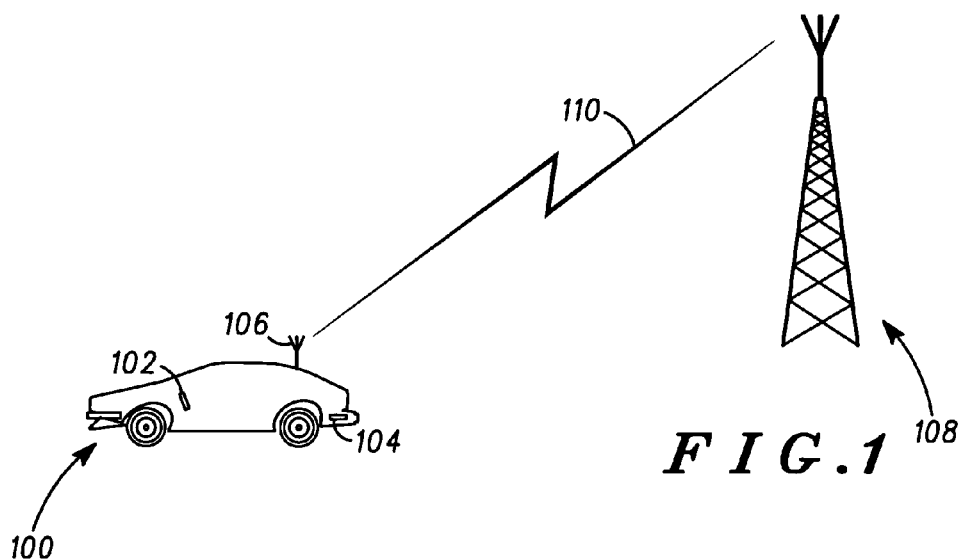
FIG. 1 is a schematic illustration of an automobile in the vicinity of a base station of a cellular telephone network.
Figure 2:
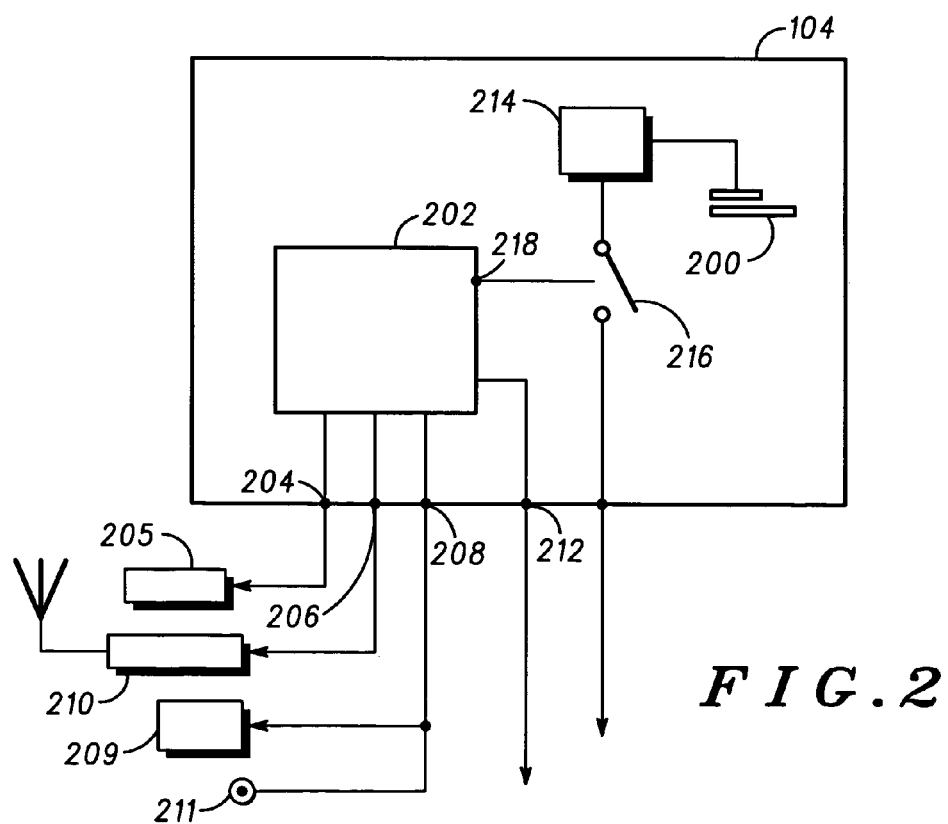

A vehicle, such as an automobile 100, includes a cellular telephone 102, such as a GSM International 2000 cellular telephone manufactured by Motorola Electronic GmbH electrically connected to a trunk unit 104 having a first SIM card reading unit 214 (FIG. 2), typically located in the boot (sometimes referred to as the 'trunk') of the automobile 100. The cellular telephone 102 (FIG. 1) is electrically connected (not shown) to an antenna 106 for communication with a base station 108 of a GSM cellular telephone network: via a radio interface 110.

The first SIM card reading unit 214 receives and holds, on a semi-permanent basis, a first SIM card 200 (hereinafter referred to as the "fixed SIM"). Referring to FIG. 3, the cellular telephone 102 has a second SIM card reading unit 304 for reading a second SIM card 300 (hereinafter referred to as the "visiting" SIM) and a keypad 306 comprising an on/off key 308 for powering-up and powering-down the cellular telephone 102. By "power-down" (or "unpower"), it is meant that the cellular telephone 102 enters a "stand-by"

mode where a keypad of the cellular telephone 102 is disabled, a display of the cellular telephone 102 is switched off, and any indication of the cellular telephone 102 being in service is removed, i.e. there is no indication to a user that the cellular telephone 102 is active. The second SIM card reading unit 304 receives, through a slot 302, the visiting SIM 300 on a permanent or temporary basis.

The first or second SIM card 200, 300 can be contactless smartcards.

It should be noted that it is also conceivable to locate the second SIM card reading unit 304 elsewhere in the automobile 100 which is accessible to a user.

The trunk unit 104 (FIG. 2) comprises a microcontroller 202 having a first terminal 204, a second terminal 206, a third terminal 208, and a fourth terminal 212, the first terminal 204 being connected to an accident detection unit 205, for example, a sensor for detecting the deployment on an airbag. The second terminal 206 is connected to a Global Positioning System (GPS) receiver 210 for the determination of a location of the automobile 100. The third terminal 208 is connected to other interfaces, for example, coupled to a security unit 209 for managing the security of the automobile 100. Additionally, or alternatively, the other interfaces can be coupled to a key, button or switch acting as a "panic button" 211 (hereinafter referred to as the panic button). The fourth terminal 212 is connected to the cellular telephone 102 located in a cabin of the automobile 100.

The second SIM card reading unit 214 is also connected to the cellular telephone 102 via a switch 216, the switch 216 being under the control of the microcontroller 202 and connected to a fifth terminal 218 of the microcontroller 202.

In each embodiment of the invention, electrical connection and activation of the fixed SIM 200 is required in order to execute a task. The task can be to update data stored by the fixed SIM 200 relating to addresses to be automatically contacted in emergency or other situations, such as upon compromise of the security of the automobile 100. In the event of an accident or other emergency, the emergency services need to be contacted. Also, it can be desirable to collect and/or transmit information relating to the performance of the automobile 100. In the event of the security of the automobile 100 being compromised, the security services/the police need to be contacted.

During normal operation, examples embodiments of the invention function as follows.

Referring to FIG. 4, the cellular telephone 102 polls the keypad 306 in order to determine (step 400) when the user has pressed the on/off key 308 in order to power-down the cellular telephone 102 into stand-by mode. When actuation of the on/off key 308 has been detected (step 400), the cellular telephone 102 executes (step 402) an update routine 500 (FIG. 5) for the fixed SIM 200.

The update routine 500 includes the following steps. The cellular telephone 102 determines (step 502) whether the visiting SIM 300 has been installed. If the visiting SIM 300 has been detected as installed, the visiting SIM 300 is electrically disconnected or ignored (step 504), and the fixed SIM 200 is electrically connected (step 506) and enabled (step 508). This can be achieved by the cellular telephone 102 instructing the microprocessor 202 to actuate the switch 216 through the fifth terminal 218. If the cellular telephone 102 determines (step 502) that the visiting SIM 300 is not installed, the fixed SIM 200 is activated (step 506) without disconnecting (step 504) the visiting SIM 300 and connecting (step 506) the fixed SIM 200; this is because, in the absence of the visiting SIM 300, the system typically automatically defaults to the connection and activation of the fixed SIM 200. A GSM dialogue (step 510) is then initiated. The dialogue can be the transmission and/or receipt of a Short Messaging Service (SMS) message, a telephone call involving the transmission of data or any other form of dialogue known in the art for the purpose of updating the fixed SIM 200. The data to be updated can be data relating to addresses described above. Once the dialogue has been completed, an inactivity timer (not shown) is initiated (step 512) for the purpose of powering-up the cellular telephone at a predetermined interval, for example, every day, week, or month, in order to update the fixed SIM 200. The update routine 500 then terminates and (FIG. 4) the cellular telephone is permitted to power-down (step 404).

Figure 6:
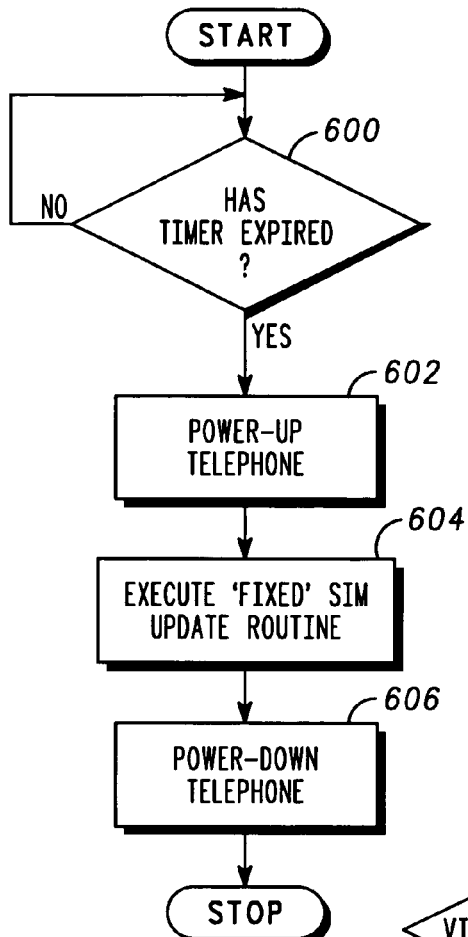

In a further example (FIG. 6), the cellular telephone 102 monitors the inactivity timer and determines (step 600) when the predetermined interval has expired. When the predetermined interval has expired, the cellular telephone 102 powers-up (step 602) automatically (i.e. without intervention by the user) and executes (step 604) the update routine 500 (FIG. 5) for the fixed SIM 200 described above. Once the update routine 500 has been executed, the cellular telephone 102 powers-down (step 606).

Figure 7:
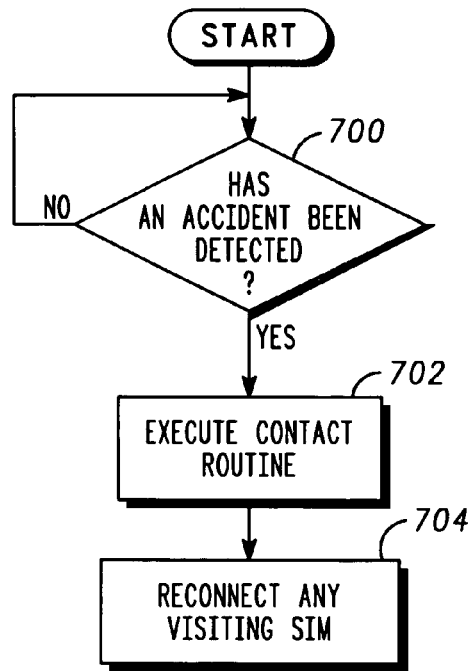
FIGS. 7 to 11 are flow diagrams of another method of operation of the apparatus of FIGS. 2 and 3 in another embodiment of the invention.
Figure 8:
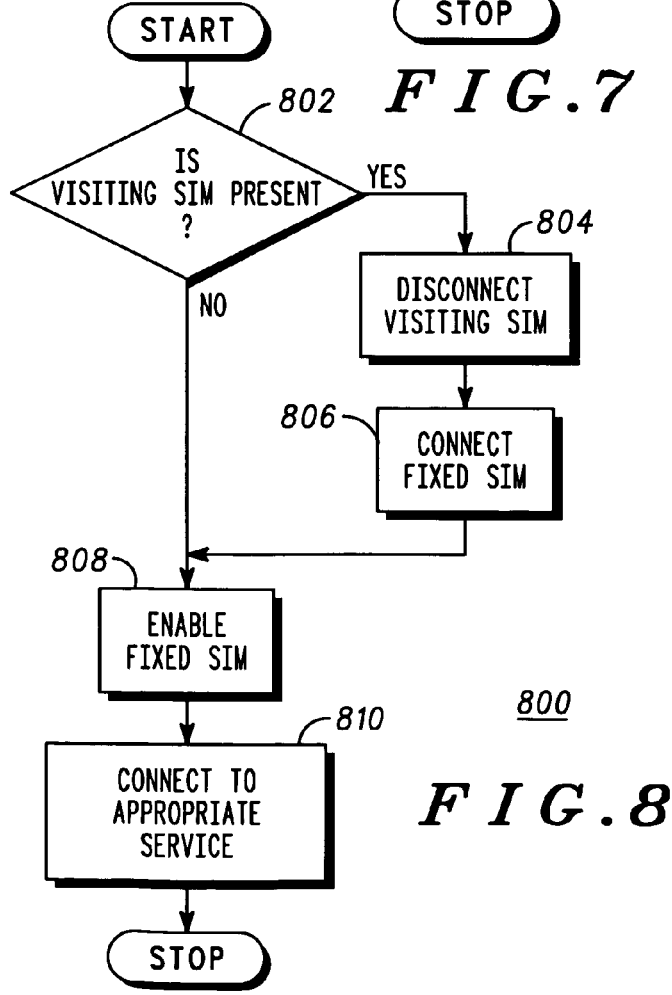

In an example of another embodiment (FIG. 7), the accident detection unit 205 monitors the sensors to determine (step 700) whether an accident has occurred, for example the detection of deployment of the airbag. If the accident has been detected, the cellular telephone 102 executes (step 702) a contact routine 800 (FIG. 8). The contact routine includes the following steps.

The cellular telephone 102 determines (step 802) whether the visiting SIM 300 is installed and activated. If the visiting SIM 300 is installed and activated, the cellular telephone 102 electrically disconnects or ignores (step 804) the visiting SIM 300 and electrically connects (step 806) the fixed SIM 200. The fixed SIM 200 is then activated (step 808). If the cellular telephone determines (step 802) that the visiting SIM 300 is not installed or activated, the fixed SIM 200 is activated without disconnecting (step 804) the visiting SIM 300 and connecting (step 806) the fixed SIM 200. The cellular telephone 102 then communicates (step 810) with an appropriate service, for example the police and/or ambulance service, by data communication, such as SMS, or voice communication, such as a pre-recorded message. The contact routine 800 then terminates and the cellular telephone 102 proceeds to reconnect (step 704) and activate any visiting SIM 300 installed in the cellular telephone 102.

Figure 9:
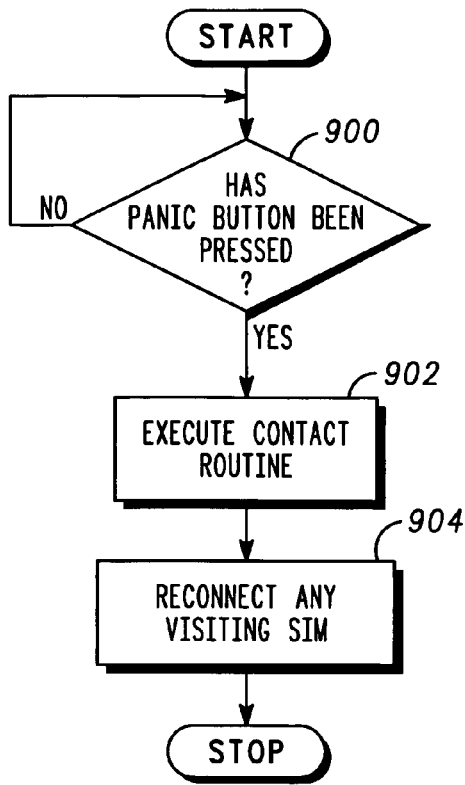

In an another example of this embodiment (FIG. 9), the cellular telephone 102 monitors (step 900) the other interfaces, via the microcontroller 202, for the actuation of the panic button 211. When the cellular telephone detects that the panic button has been actuated, the cellular telephone 102 executes (step 902) the contact routine 800 described above. However, in this case the appropriate service contacted (step 810) is the police. Once a message has been sent to the police, the cellular telephone 102 reconnects (step 904) any visiting SIM 300 installed in the cellular telephone 102.

Figure 10:
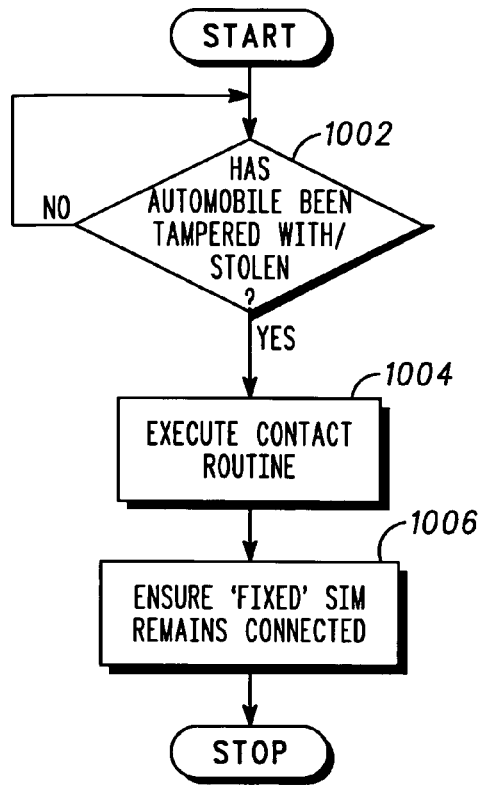
Figure 11:
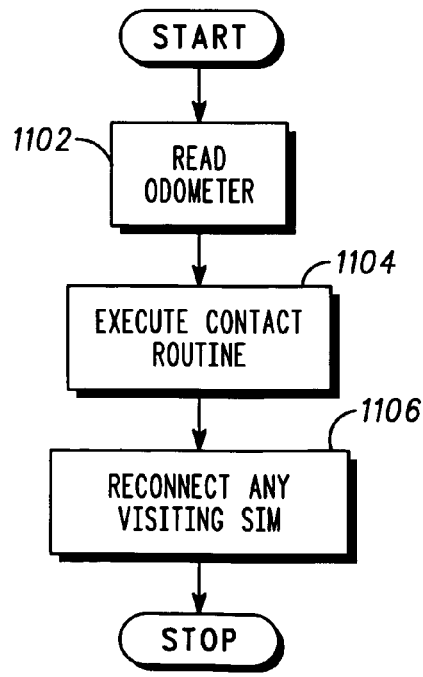

In a further example of this embodiment (FIG. 10), the cellular telephone 102 polls the security unit 209 in order to determine (step 1002) whether an unauthorised party is tampering with the automobile 100 or whether the automobile 100 has been stolen. If any of the above conditions have been detected (step 1002), the cellular telephone 102 executes (step 1004) the contact routine 800. Again, the appropriate service contacted (step 810) can be the police or a security company which monitors the security of the automobile 100. Whilst contacting the police or the security company, the cellular telephone 102 receives position data relating to the location of the automobile 100 from the GPS receiver 210 and communicates the position data to the police and/or the security service. Once the contact routine 800 has terminated, the cellular telephone 102 ensures (step 1006) that the fixed SIM 200 remains electrically connected and activated so as to communicate updated position data, if necessary.

In another example of this embodiment (FIG. 9), the cellular telephone 102 monitors (step 900) the other interfaces, via the microcontroller 202, for the actuation of the panic button 211. When the cellular telephone detects that the panic button has been actuated, the cellular telephone 102 executes (step 902) the contact routine 800 described above. However, in this case the appropriate service contacted (step 810) is the police. Once a message has been sent to the police, the cellular telephone 102 reconnects (step 904) and visiting SIM 300 installed in the cellular telephone 102.

Such a procedure as described above can be executed whilst the cellular telephone 102 is powered-up, or alternatively, whilst the cellular telephone 102 is powered-down or upon initial powering-up of the cellular telephone 102 so as to minimise delay to the user in using the cellular telephone 102.

It is conceivable that in addition to or instead of the odometer reading other information can be communicated to the manufacturer or the garage, for example, details of faults detected by an engine management system or other sensors.

What is claimed is:

1. A data carrier system comprising a first data carrier selectively couplable to a communications device and a second data carrier selectively couplable to the communications device in preference to the first data carrier, the first data carrier being arranged to be decoupled from the communications device when the second data carrier is coupled to the communications device; and during a predetermined period of time the communications device is arranged to be ensured of a supply of power by maintaining the supply of power to the communications device in response to a command to extinguish the supply of power to the communications device, wherein upon receiving a command to extinguish the supply of power to the communications device; the second data carrier is arranged to be decoupled from the communications device, the first data carrier is coupled to the communications device, a communication task involving information is performed the information is used to update information in the first data carrier, the first data carrier is decoupled from the communication device, and the second data carrier is recoupled to the communication device, whereinafter the supply of power to the communication device is extinguished.

2. A system as claimed in claim 1, wherein the communications device is actuable between a powered state and an unpowered state, the communications device being arranged to be actuated from the unpowered state to the powered state at a predetermined interval for substantially at least the predetermined period of time, wherein the first data carrier is coupled to the device to undertake a communication to update information in the first data carrier.

3. A system as claimed in claim 1, wherein the first data carrier is coupled to the device to undertake a communication to update information in the first data carrier.

4. A system as claimed in claim 1, wherein at least one of the group of the first data carrier and the second data carrier is a smartcard.

5. A system as claimed in claim 1, wherein the communication task involves calling a particular phone number stored in the first data carrier.

6. A method of operating a data carrier system including a first data carrier selectively couplable to a communications device and a second data carrier selectively couplable to the communications device in preference to the first data carrier, the first data carrier being arranged to be decoupled from the communications device when the second data carrier is coupled to the communications device, the method comprising the steps of;
during a predetermined period of time, ensuring a supply of power to the communications device by maintaining the supply of power to the communications device;
receiving a command to extinguish the supply of power to the communications device,
decoupling the second data carrier from the communications device,
coupling the first data carrier to the communications device;
initiating and executing a communication task involving information in the first data carrier;
updating information in the first data carrier;
decoupling the first data carrier from the communications device,
recoupling the second data carrier to the communications device; and
extinguishing power to the communication device.

7. A method as claimed in claim 6, wherein the communications device is actuable between a powered state and an unpowered state, and further comprises actuating the communications device from the unpowered state to the powered state at a predetermined interval for substantially at least the predetermined period of time, wherein the first data carrier is coupled to the device to undertake a communication to update information in the first data carrier.

8. A method as claimed in claim 6, wherein the first data carrier is coupled to the device to undertake a communication to update information in the first data carrier, whereafter the communication device is powered down.

9. A method as claimed in claim 6, wherein at least one of the first data carrier and second data carrier is a smartcard.

10. A method as claimed in claim 6, wherein the communication task involves call a particular phone number stored in the first data carrier.

11. A method as claimed in claim 9, wherein the smartcard is a contactless smartcard.

12. A method as claimed in claims 9 wherein the smartcard is a Subscriber Identity Module.

13. A method as claimed claim 6, further comprising providing location determining means.

14. A method as claimed in claim 13, wherein the location determining means is a Global Positioning System receiver.

15. A method as claimed claim 6, wherein the communication task is to update data stored in the first data carrier using the communications device.

16. A method as claimed in claim 15 wherein the data to be updated includes addresses to be used in conjunction with vehicle applications.

17. A method as claimed in claim 16 wherein the vehicle applications include one or both of security call and emergency call applications.

18. A system as claimed in claim 1, further comprising a location determining receiver.

19. A system as claimed in claim 18, wherein the location determining receiver is a Global Positioning System receiver.

20. A system as claimed in claim 1, further comprising means for receiving the first data carrier, wherein the first data carrier is arranged to be substantially permanently in engagement with the means for receiving the first data carrier.

21. A vehicle incorporating a data carrier system comprising a first data carrier selectively couplable to a communications device and a second data carrier selectively couplable to the communications device in preference to the first data carrier, the first data carrier being arranged to be decoupled from the communications device when the second data carrier is coupled to the communications device; and during a predetermined period of time the communications device is arranged to be ensured of a supply of power by maintaining the supply of power to the communications device in response to a command to extinguish the supply of power to the communications device, wherein upon receiving a command to extinguish the supply of power to the communications device; the second data carrier is arranged to be decoupled from the communications device, the first data carrier is coupled to the communications device, a communication task involving information is performed, the information is used to update information in the first data carrier, the first data carrier is decoupled from the communication device, and the second data carrier is recoupled to the communication device, whereinafter the supply of power to the communication device is extinguished.

22. A cellular telephone incorporating a data carrier system comprising a first data carrier selectively couplable to a communications device and a second data carrier selectively couplable to the communications device in preference to the first data carrier, the first data carrier being arranged to be decoupled from the communications device when the second data carrier is coupled to the communications device; and during a predetermined period of time the communications device is arranged to be ensured of a supply of power by maintaining the supply of power to the communications device in response to a command to extinguish the supply of power to the communications device, wherein upon receiving a command to extinguish the supply of power to the communications device; the second data carrier is arranged to be decoupled from the communications device, the first data carrier is coupled to the communications device, a communication task involving information is performed, the information is used to date information in the first data carrier, the first data carrier is decoupled from the communication device, and the second data carrier is recoupled to the communication device, whereinafter the supply of power to the communication device is extinguished.

* * * * *

UNITED STATES PATENT AND TRADEMARK OFFICE
CERTIFICATE OF CORRECTION

| | | |
|---|---|---|
| PATENT NO. | : 7,003,319 B1 | Page 1 of 1 |
| APPLICATION NO. | : 09/673273 | |
| DATED | : February 21, 2006 | |
| INVENTOR(S) | : Howell et al | |

It is certified that error appears in the above-identified patent and that said Letters Patent is hereby corrected as shown below:

Col. 6, line 44, change "call" to --callling--

Signed and Sealed this

Eighth Day of August, 2006

JON W. DUDAS
*Director of the United States Patent and Trademark Office*